Jan. 27, 1970    J. C. WHITE    3,491,633

PLASTIC CONTAINER TRANSFER APPARATUS AND METHODS

Filed Feb. 1, 1967    8 Sheets-Sheet 1

FIG. 1

INVENTOR.
JAMES C. WHITE

BY
Learman & McCulloch

INVENTOR.
JAMES C. WHITE
BY
Learman & McCulloch

Jan. 27, 1970 J. C. WHITE 3,491,633
PLASTIC CONTAINER TRANSFER APPARATUS AND METHODS
Filed Feb. 1, 1967 8 Sheets-Sheet 7

INVENTOR.
JAMES C. WHITE
BY
Leeman & McCulloch

FIG. 12

INVENTOR.
JAMES C. WHITE
BY
Leaman & McCulloch

United States Patent Office 3,491,633
Patented Jan. 27, 1970

3,491,633
PLASTIC CONTAINER TRANSFER APPARATUS
AND METHODS
James C. White, Gladwin, Mich., assignor to Brown Machine Company of Michigan, Inc., Beaverton, Mich., a corporation of Michigan
Filed Feb. 1, 1967, Ser. No. 613,262
Int. Cl. B65g 47/06
U.S. Cl. 83—23     19 Claims

ABSTRACT OF THE DISCLOSURE

An apparatus and method for separating a stack or plurality of stacks of nested containers into individual groups of nested containers and delivering them for further processing. A reciprocally movable flexible finger removes a portion of each stack after the stack reaches a predetermined length and restraining means may be provided to restrain movement of the remainder of the stack. Conveyor means may then be provided to deliver the nested groups to further processing machinery such as a rim curler. In one embodiment, superposed tiers of stacked containers may be handled and in the removed superposed stack portions sequentially delivered to the conveyor.

---

This invention relates to apparatus and methods for handling plastic containers and like products and more particularly to apparatus and methods for separating a group of nested containers from a stack of such articles and transferring successive groups of containers in such manner as to present the groups of containers in proper condition for further processing.

Plastic containers have in commercial practice been transferred individually through pneumatic tubes from differential pressure forming and cutout machine stations to rim curling machine stations. This practice has created handling and control problems for processors and machinery designers. An important object of this invention is to provide improved methods and apparatus for transferring such containers in groups to the rim curling machine and maintaining control of them at all times.

Another object of the invention is to provide improved methods and apparatus for separating groups containing a predetermined number of containers from stacks of these containers in a manner such that suction forces and static electricity developed in the stack do not create problems and the stacks may be transferred to other processing apparatus in proper condition for further processing and at a predetermined rate corresponding to the speed of operation of the processing apparatus to which they are delivered.

Another object of the invention is to provide apparatus and methods for separating groups of nested containers from vertically spaced stacks and depositing the separated groups on a single level transfer device and in properly spaced relation.

Another object of the invention is to provide apparatus of the character referred to which is simplified in construction and operation.

Other objects and advantages of the invention will be pointed out specifically or will become apparent from the following description when it is considered in conjunction with the appended claims and the accompanying drawings, in which:

Apparatus constructed in accordance with the embodiment of the invention disclosed in FIGURES 1–9 comprises a frame generally designated 1 having parallel side members 2 joined by a plurality of cross bars 3 at opposite ends of the frame. Each cross bar 3 includes a cross plate 3a provided with a plurality of circular recesses 4 therein (see FIGURE 3). Associated with the recesses 4 shown in FIGURE 3 and spanning the members 3 are five sets of arcuately arranged supporting rods 5 forming five ways or chutes 5a (FIGURE 1) on which stacks of containers designated generally by the reference character C may be supported for movement longitudinally of the frame. Partition walls 6 are connected between the cross bars 3 to form side walls for the individual ways.

The frame 1 is disposed adjacent the discharge end of a plastics trimming machine generally designated 7 to which is fed a vertically movable plastic sheet or web P in which the containers C have been formed. Such a machine is disclosed in the present assignee's Martin U.S. Patent No. 3,217,576, granted Nov. 16, 1965, and in my copending application entitled Trimming Apparatus filed of even date herewith, wherein the container parts being punched out are lids. It is to be understood that a similar machine is used for severing containers such as shown at C in the present application and that mechanism of the character disclosed in my copending application is included to push such containers continuously forwardly to keep adding containers to the stacks of containers which issue from the trimming machine 7. The counting and associated mechanism utilized in the copending application is omitted. After the plastic sheet P indexes vertically, the containers C are severed from the sheet and as each container C is severed from the sheet P it is indexed or moved forwardly. The machine 7 includes a frame F mounting guide rods 8 for a horizontally moving reciprocating platen 9 mounting a die plate 10 having annular tubular severing dies 10a thereon. Provided opposite the platen 9 is a stationary die block 11 having openings 11a in concentric alignment with openings O in the frame F and the sets of rods 5, so as to eventually introduce each separated part to the associated set of supporting rods 5 forming an associated chute 5a. The severing die tubes 10a have circular cutting edges 10b which cooperate with the edges of openings 11a to cut the containers C from the sheet P and incorporate pusher rods 12 which advance the cups or containers a cup or container length forwardly of sheet P just after the containers C are separated. The rods 12 and platen 9 could be air cylinder operated but preferably are operated from a common drive shaft as disclosed in the aforementioned copending application.

As disclosed herein (see FIGURE 5A), each article C comprises a hollow, tapered container having a closed end and an open end surrounded by a peripheral, reversely turned flange 13. The taper of the container C is such that the open end of one container is adapted to receive the closed end of another container, thereby enabling successive containers discharged from the trimming machine 7 to be nested in each container stack S which is indexed or moved in a direction from the inlet end of the frame 1 to the opposite or discharge end thereof.

Means designated generally by the reference character 15 is provided for separating groups G (see FIGURES 1 and 4) of stacked containers C from the stacks S. The separating means comprises a flexible spring steel finger 16 associated with each set of rods 5 or way 5a and having a nylon pad end 17 which is adapted to extend under the flange 13 of any one of the containers C in the stack S and push the engaged container, and all those nested within it, in a direction toward the discharge end of the frame 1. Each of the fingers 16 is fixed to a support bar 18 which substantially spans the width of the frame 1 and is secured at its opposite ends to sprocket chains 19. Each of the chains 19 includes an upper run 20 which passes over upper sprocket wheels 21 journaled on stub shafts 21a on the frame members 2 and a lower run 22 which passes over sprocket wheels 23 journaled on stub shafts 23a on the frame members 2. Intermediate sprockets 24 on stub shafts 24a are also provided. The upper run 20 of each chain passes under a drive sprocket 25 fixed on a shaft 25a which spans the frame 1 and is journaled in bearings 26. At one side of the frame, the shaft 25 projects beyond the frame and has fixed thereto a gear 27 that meshes with a toothed rack 28. The outboard end of the shaft 25 is journaled in a bearing 29 which is suitably fixed to the frame 1. Each chain 19 has a switch actuating member 30 on its lower run for a purpose presently to be explained.

The rack 28 preferably is comprised by the piston rod of a double-acting ram 36 having a cylinder 37 provided with the usual advance and retract solenoids 38 and 39 (see FIGURE 9) which cause pressure fluid to be introduced to and exhausted from opposite ends of the cylinder so as to effect advancing and returning movements of the rack 28. The ram 36 is mounted on the frame 1 by a suitable support 40. The arrangement is such that movement of the rack 28 in one direction causes conjoint movement of the chains 19 so as to effect simultaneous movement of the upper and lower runs 20 and 22, respectively, in opposite directions. The separating fingers 16 and the switch actuator 30 will move in the direction of the respective chain runs 20 and 22.

Figure 1:
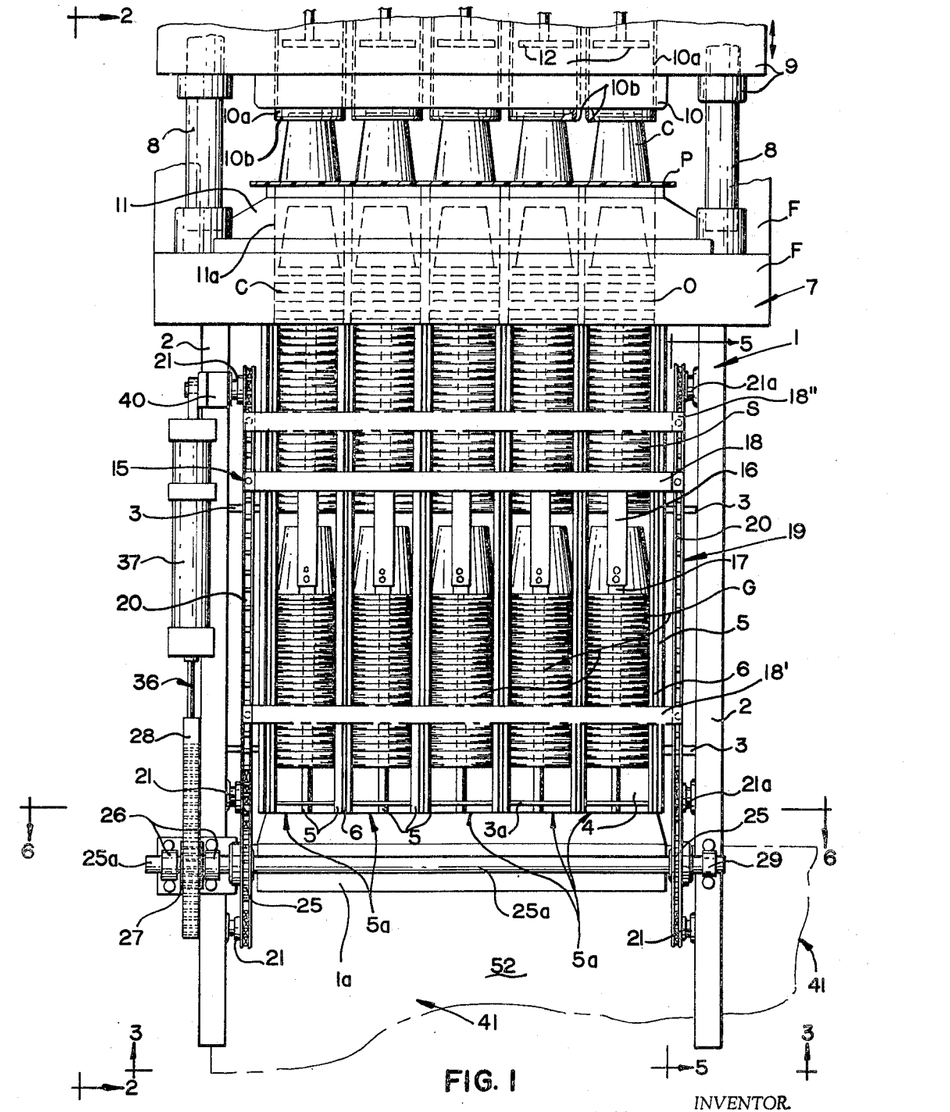
FIGURE 1 is a fragmentary top plan view of container handling apparatus constructed in accordance with one embodiment of the invention.
Figure 2:
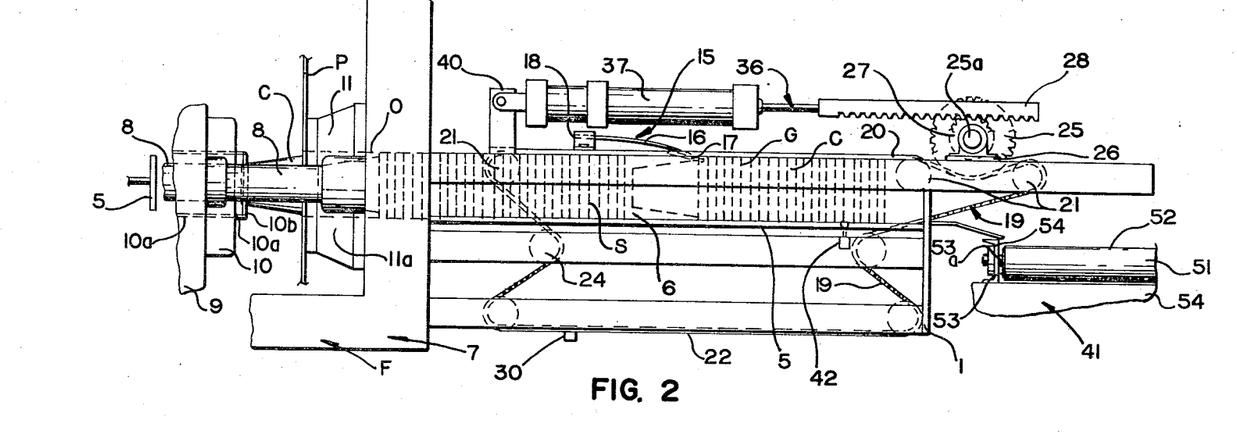
FIGURE 2 is a fragmentary, side elevational view of a portion of the apparatus shown in FIGURE 1 taken on the line 2—2 of FIGURE 1.
Figure 3:
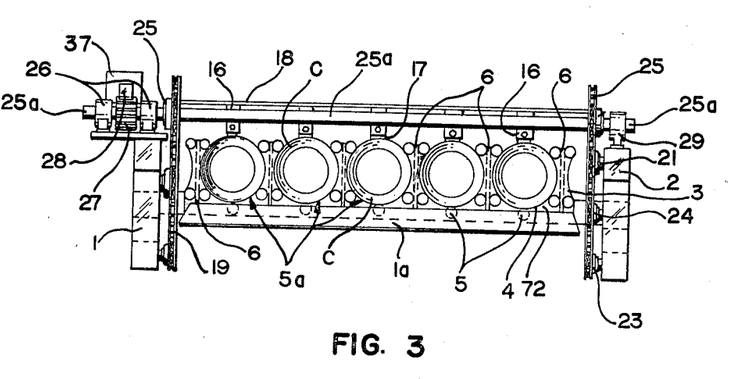
FIGURE 3 is an end elevational view taken on the line 3—3 of FIGURE 1.
Figure 4:
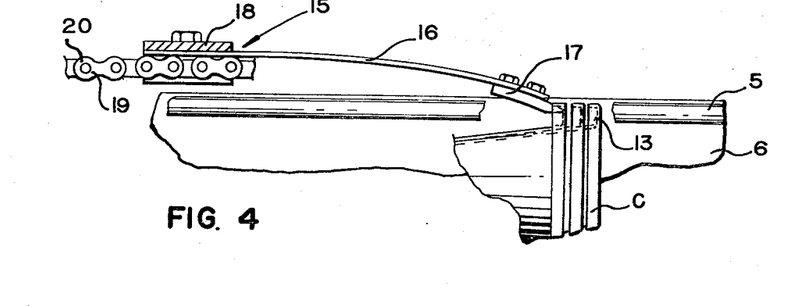
FIGURE 4 is an enlarged side elevational view of a portion of the apparatus shown in FIGURES 1–3 and illustrating a group of nested containers in the process of being separated from a stack of such containers.
Figure 5:
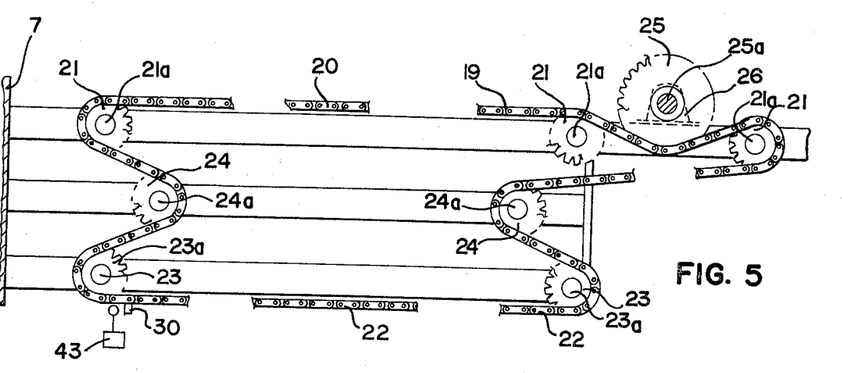
FIGURE 5 is a diagrammatic view of the operating mechanism for the separating apparatus.
Figure 5A:
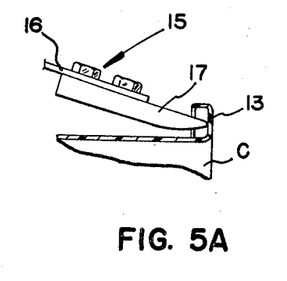
FIGURE 5A is a greatly enlarged, partly side elevational and partly sectional view illustrating the manner in which a stack separating finger engages a container.
Figure 6:
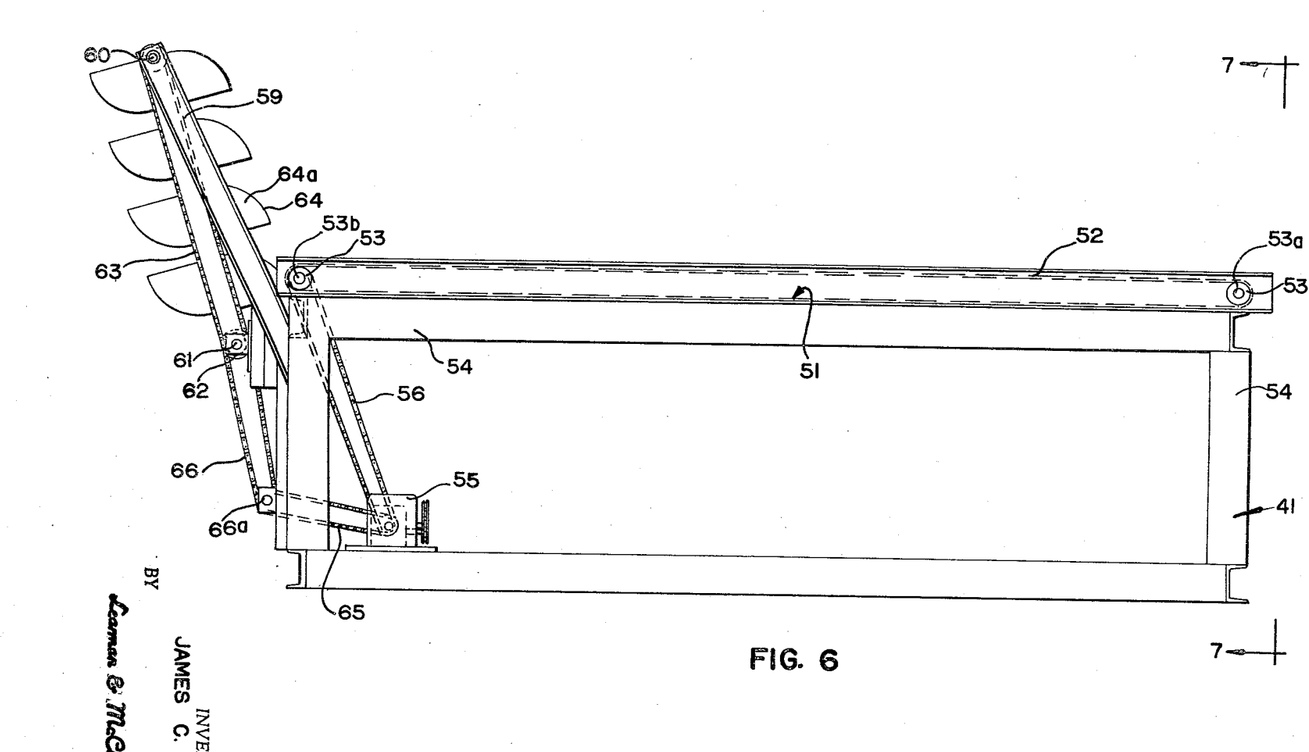
FIGURE 6 is a partly side elevational and partly sectional view of conveying mechanism taken on the line 6—6 of FIGURE 1.
Figure 7:
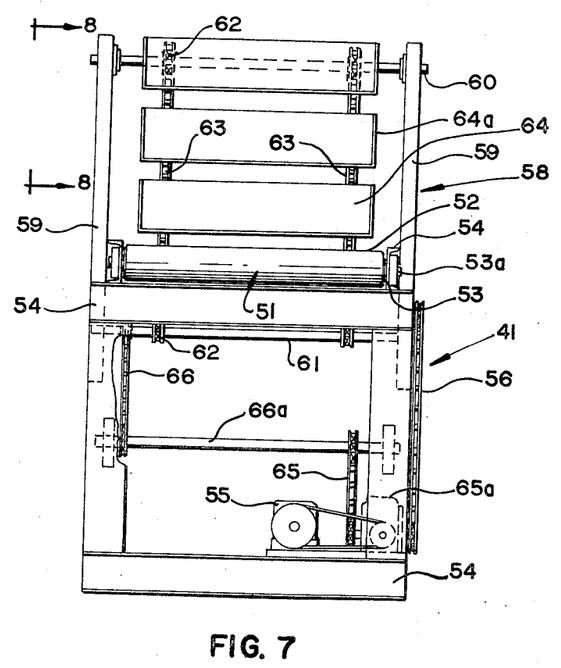
FIGURE 7 is an end elevational view taken on the line 7—7 of FIGURE 6.
Figure 8:
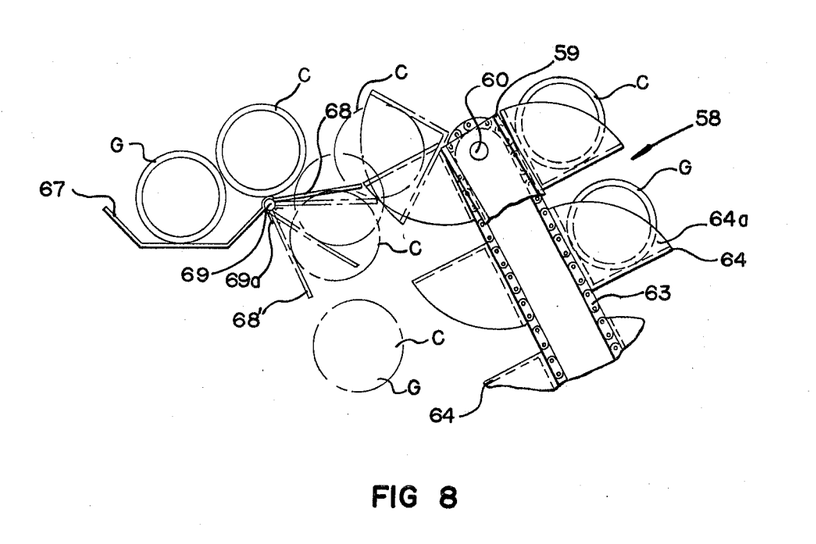
FIGURE 8 is an enlarged, fragmentary, side elevational view of a portion of the apparatus shown in FIGURES 6 and 7 taken on the line 8—8 of FIGURE 7.
Figure 9:
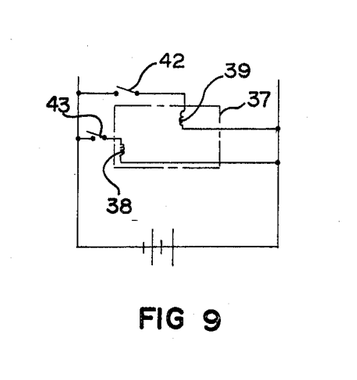
FIGURE 9 is a typical electrical control circuit for the apparatus.

In the operation of the apparatus thus far described, individual containers C discharged from the trimming machine 7 will be introduced to the several ways 5a where they will be simultaneously nested and stacked, as well as moved intermittently from the loading end of the frame 1 toward a discharge platform 1a. The fingers 16 are operated intermittently and in FIGURE 1 are shown in the act of moving a series of groups of containers G to a transversely disposed discharge conveyor generally designated 41. When the fingers 16 have moved to a forward position adjacent conveyor 41, as indicated by the forward diagrammatic lines 18' in FIGURE 1, they remain until the stacks S again grow to a predetermined length. When a limit switch 42 (see FIGURE 2) is operated to indicate growth of the stacks S to a predetermined length, the circuit to retract solenoid 39 is closed and pressure fluid is admitted to the right end of the cylinder 37 in FIGURE 2. Pressure fluid admitted to this end of the cylinder 37 will cause the rack 28 to return toward the charge end of the frame 1 to the rear position indicated by the rear diagrammatic lines 18″ in FIGURE 1. As the rack retracts, the shaft 25 is rotated via the gear 27 so as to cause the separator fingers 16 to move longitudinally of the stacks to the position shown in broken lines at 18″. The fingers, 16 and plastic containers C are sufficiently flexible that rearward dragging movement of fingers 16 over the stacks S does not injure them and has the advantage of more snugly nesting them. When fully nested there still remains a slight space between the container rims (see FIGURE 4). At this time the travel of rack 28 is reversed by actuator 30 making a switch 43 (see FIGURE 5) which energizes the advance solenoid 38 and the fingers 16 move forwardly in a direction toward the discharge end of the frame 1 and at a speed in excess of the speed of indexing of the stacks S. As the separating fingers 16 are moved forwardly, their free ends 17 engage under the flange 13 of a container in each stack S, between the ends of the latter, and advance or propel each engaged container, and all those forwardly thereof, toward the discharge end of the frame, the fingers 16 all the while remaining in engagement with the associated flanges 13. Groups G of articles C thus are separated from the stacks S.

Figure 14:
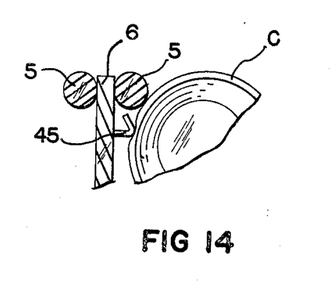
FIGURE 14 is an enlarged fragmentary view illustrating one of the elongate retarding members employed with both forms of the invention.

Inasmuch as the stacks S are formed by the accumulation of successive containers C and inasmuch as each stack is advanced or indexed in response to the addition of successive containers thereto, there may be a tendency for the side walls of adjacent containers to stick to each other, and this tendency may be increased by the effects of suction and static electricity. To overcome any tendency of the adjacent containers to stick in the separation of a group thereof from a stack, a substantially V-shaped guide or retarding member 45 extending substantially the length of each chute 5a (see FIGURE 14) is positioned adjacent each stack of containers on one of the partition walls 6 of each way 5a so as to engage and deform slightly inwardly each flange 13. The retarding force exerted on the containers by the members 45 is not sufficient to affect adversely the indexing of the stacks, but is sufficient to enable a clean separation of a group of containers from the remainder of the stack.

At the discharge end of the frame 1 is mounted the transverse conveyor 41 which preferably comprises an endless belt 51 having an upper run 52 which moves to the right, as shown in FIGURE 1, and which is supported at such level as to receive the groups G of containers moved forwardly of the frame 1 by the separating fingers 16. The belt 51 is trained around rollers 53 which are journaled by shafts 53a and 53b on a supporting frame 54 and is driven by an electric motor 55 via a chain 56. The one shaft 53b mounts a sprocket around which chain 56 is trained.

Groups G of containers C deposited on the upper run 52 of the conveyor belt 51 are delivered to elevating apparatus indicated generally by the reference character 58.

The elevating apparatus comprises a pair of upwardly inclined frame channel members 59 that are secured at their lower ends to the frame 54 and which are spanned by upper and lower shafts 60 and 61, respectively, on which are fixed sprocket wheels 62. Trained around the sprocket wheels 62 are endless chains 63 on which are fixed a plurality of generally L-shaped flights 64 having end walls 64a. The shaft 61 is driven from the motor 55 via a speed reduction unit 65a and chains 65 and 66 through an intermediate shaft 66a, the arrangement being such that the flights 64 confronting the conveyor run 52 move upwardly to the upper ends of the members 59.

Supported by a suitable frame (not shown) adjacent to the upper end of the elevator apparatus 58 is the generally channel-shaped, elongate trough or receiver 67 (FIGURE 8) of a rim curling machine such as shown in applicant's assignee's copending application U.S. Ser. No. 543,478, now Patent No. 3,337,919, into which successive groups of containers are adapted to be discharged by the elevator apparatus 58. Interposed between the upper end of the elevator 58 and the trough 67 is a deflectable bridge or diverter member 68 which is pivoted on a shaft 69. The shaft 69 is urged by a torsion spring 69a in a direction to cause the bridge member 68 normally to assume the inclined position between the trough 67 and the elevator 58, as shown in full lines in FIGURE 8, so as to receive groups G of containers C from the elevator 58 and permit them to roll by gravity into the trough 67 in which they may be moved endwise by the operator to the rim curling machine. Containers C introduced to the trough 67 may be adapted to be moved longitudinally thereof by suitable conveying means not shown, but should a group G of containers C not be moved clear of the path of a subsequent group G of containers C discharged from the elevator, the subsequently discharged group will be urged by the associated flight 64 downwardly with sufficient force to overcome the force of the torsion spring 69a and deflect the bridge 68 to the position 68' shown in broken lines in FIGURE 8, thereby avoiding the accumulation of groups of containers on the trough 67.

Figure 12:
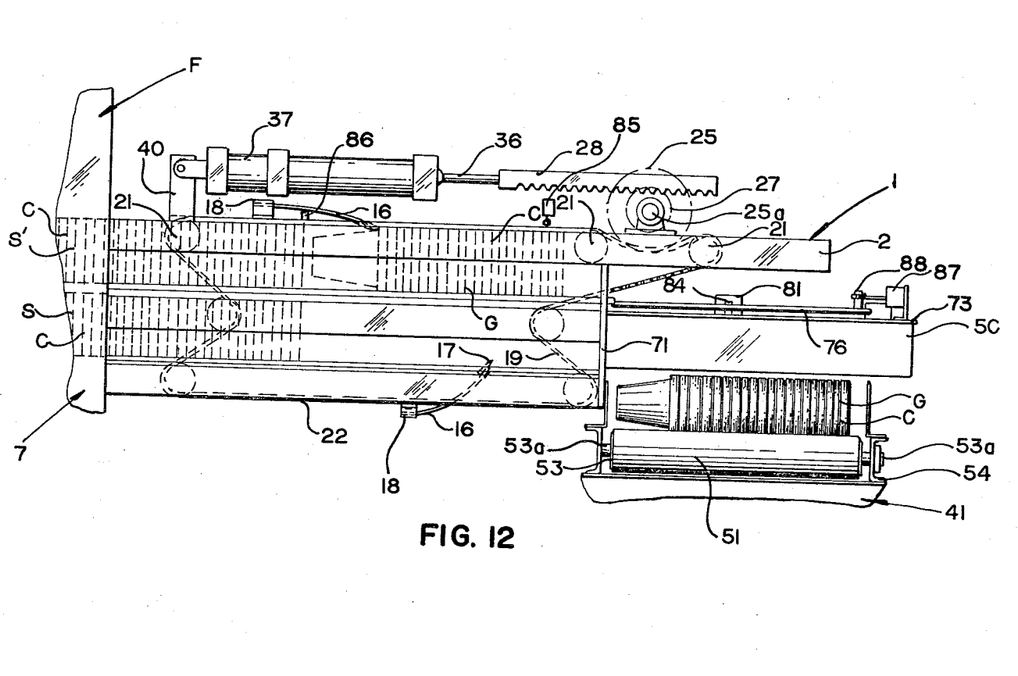
FIGURE 12 is a sectional side elevational view similar to FIGURE 2 of the modified form of the invention.
Figure 13:
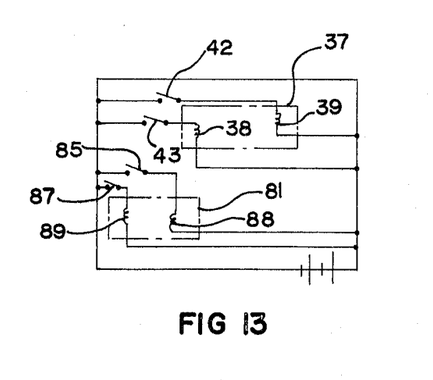
FIGURE 13 is a typical electrical control circuit for the modified embodiment of the invention.

The embodiment of the invention shown in FIGURES 10–13 functionally is quite similar to that earlier described, but differs from the latter primarily in that containers discharged from the trimming machine 7 are discharged simultaneously in laterally spaced rows and vertically spaced tiers. Thus, as is best shown in FIGURE 12, containers discharged from the trimming machine 7 comprise five lower rows of stacks S, as before, and in addition five upper rows of stacks S'. The vertical tiers of stacks require some change in the mechanism for separating and collecting groups of containers from the two groups of stacks, as will be explained. Apparatus disclosed in the embodiment of FIGURES 10–13 which correspond to apparatus disclosed in the earlier embodiment are identified by the same reference characters.

In the embodiment shown in FIGURES 10–13, the chains 19 are arranged in the manner previously described. In this embodiment, the lowermost stacks S of containers C correspond to the stacks of containers illustrated in the earlier described embodiment, and for convenience the separating fingers 16 are supported on the lower run 22 of the chains 19 so as to be capable of discharging groups of containers from the lower set of stacks directly to the transverse conveyor 41 in the same manner as has earlier been described except that the fingers 16 extend upwardly at a slightly inclined angle rather than downwardly. Separating fingers 16', like the fingers 16, are supported on the upper runs 20 of the chains 19. In addition, the switch actuator 30 and the switch 43 are associated with the upper run 20 of the chains 19.

In the embodiment disclosed in FIGURES 10–13, the frame 1 is provided with upstanding frame members 71 on which is supported an upper frame 72 which, in turn, supports a plurality of the elongated guides or rods 5 and which perform the similar function of forming ways 5a for supporting and guiding the containers of the upper stacks S'. Retarding members 45a similar to the members 45 also are provided for the containers of the upper stacks.

Figure 10:
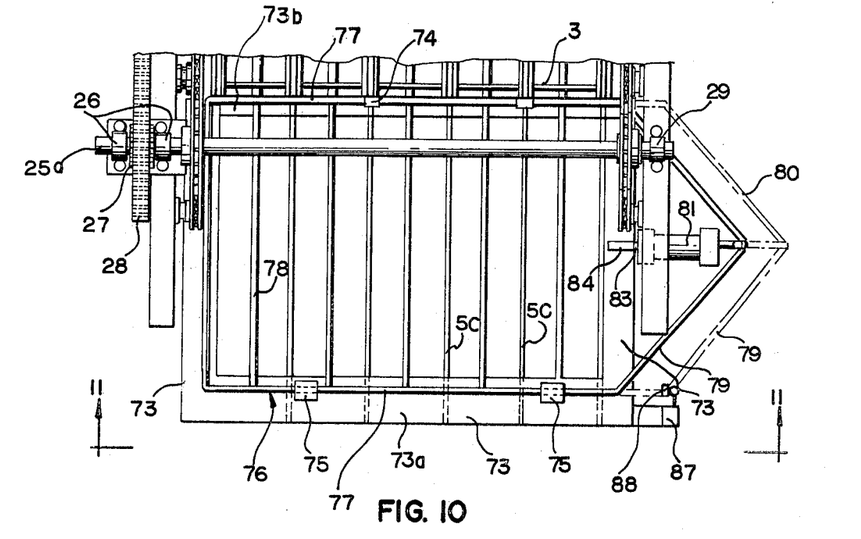
FIGURE 10 is a fragmentary top plan view illustrating a modified form of the apparatus in which upper and lower stacks of containers are being moved from a trim press to the takeaway conveyor and deposited alternately thereon by gating apparatus which is shown mounted above the takeaway conveyor.
Figure 11:
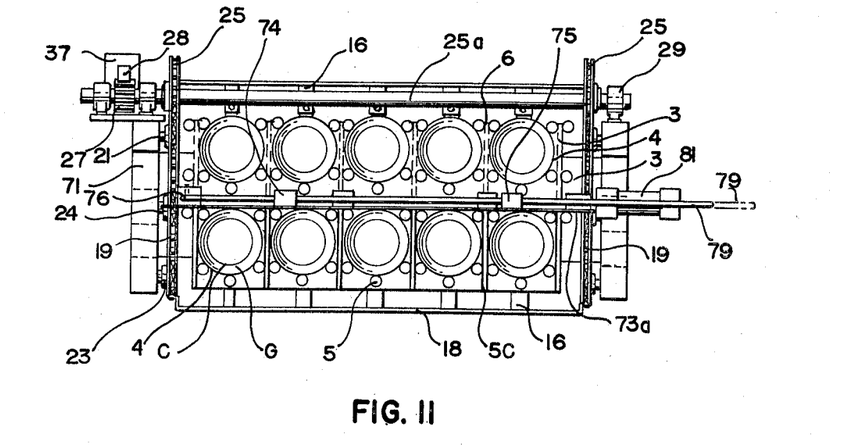
FIGURE 11 is an end elevational view of the apparatus shown in FIGURE 10 taken on the line 11–11 of FIGURE 10.

As is best shown in FIGURES 10 and 12, the frame 72 projects beyond the frame 1 and overhangs the conveyor 42. The frame 72 includes a pair of forwardly extending frame members 73 including spanning rear and front bars 73a and 73b, respectively, on which are mounted rearward and forward slide guides 74 and 75, respectively, and in which is slidably mounted a laterally reciprocable, lattice-like frame 76 composed of transverse rods 77 joined by longitudinally arranged rods 78 which extend in prolongation of the upper stack guide rods 5. It is the rods 77 which are slidably received by slide bearings or guides 74 and 75. Between each adjacent pair of rods 78 is a rod 5c which is an extension of a rod 6 and is fixed to the frame 72.

At one side of the frame 76, the transverse rods 77 are bent to converge toward each other as at 79 and 80 and are joined to one end of an air cylinder 81, the piston rod 83 of which is fixed to one of the frame members 73 by a lug 84. The ram 81 is a double-acting ram and is operable to shift the frame 76 to the right in FIGURE 10 from the full line position to the broken line position in response to the engagement of a switch 85 which is mounted in the path of a switch operator 86 that is supported on the upper run 20 of one of the chains 19. The ram 81 also operates to restore the frame 76 to its original position in response to the engagement of a switch 87 by a switch actuator 88. The switches 85 and 87 operate advance and retract solenoids 88, 89 in cylinder 81.

In the operation of the apparatus illustrated in FIGURES 10–13, containers C are discharged from the trim press machine 7 in the two tiers of rows and are simultaneously stacked and indexed toward the discharge end of the apparatus. The chains 19 are driven back and forth under the influence of the ram 36, in the manner previously explained, so as to effect simultaneous movement in opposite directions of the separator fingers 16 and 16'. The cycle initiating switch 42 may be assumed to be opposite a run 22 to indicate when the lower stacks S have grown to the predetermined length. Accordingly, groups of containers from the lower and upper tiers of stacks are separated sequentially by the operation of the ram 36 which is common to both sets of separating fingers 16 and 16'.

Groups of containers separated from the lower tier of stacks are advanced by the separator fingers 16 and are discharged by gravity directly to the conveyor 41. Groups of containers separated from the upper tier of stacks are advanced toward the frame 76 and are pushed forwardly so as to be supported partially by the rods 5c and by the rods 78. When the separator fingers 16' reach their forwardmost position, the switch 85 is closed so as to operate the ram 81 and effect lateral shifting of the frame 76, thereby increasing the spacing between the rods 78 and the rods 5c a distance sufficient to permit the groups of containers to fall through the frame 76 and be received by the conveyor 41. The groups G of containers C discharged from the tiers of containers thus are delivered alternately.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:

1. A method of handling nestable plastic container parts comprising: separating them from a sheet of plastic having a plurality of container parts differential pressure thermoformed therein and stacking the separated containers in nested stacks extending from the separating station; maintaining certain containers in the stack in a state of radial compression to hold the stack in tightly nested condition and assist in the removal of an outermost portion without displacing immediately following containers; moving the stacked containers outwardly from the separating station in increments as additional containers are added to the stacks at the separating station; and separating the outermost portion of each stack therefrom at intervals and conveying it as a nested stack portion to a remote location for further processing.

2. A method of handling nestable plastic container parts comprising: separating them from a sheet of plastic having a plurality of container parts differential pressure thermoformed therein and stacking the separated containers in superposed tiers of nested stacks extending outwardly from the separating station; moving the stacked containers outwardly from the separating station in increments as additional containers are added to the stacks at the separating station; and alternately separating the outermost portions of the upper and lower tiers of stacks therefrom at intervals and conveying them as nested stack portions to a remote location for further processing.

3. Apparatus for handling generally horizontally disposed rows of stacked containers having radially projecting rims comprising; tubular die means comprising a separating station for separating containers from a generally vertically disposed plastic web in which they have been differential pressure thermoformed; transversely spaced, generally horizontally extending, elongate stack support chutes extending forwardly from said die means and having support and guide surfaces generally concentric with the axes of said die means; means for moving the separated containers in stacks along said chutes and adding newly separated containers to the rear of the stacks at the separating station so that said stacks grow in length as containers are separated, conveyor means for said support chutes adjacent the front ends thereof; a plurality of separating fingers mounted to engage the rim of a container in each stack intermediate the ends of each chute, said fingers being flexible and in normal position extending into said stack support chutes; and means for moving said fingers in a reciprocatory path and halting said fingers in forward position to permit said stacks to grow so that when said fingers return rearwardly they brush past the containers and tightly nest said stacks; said last mentioned means moving said fingers forwardly to separate portions of said stack from the remainder thereof and convey them to said conveyor means.

4. Apparatus for handling generally horizontally disposed rows of stacked containers having radially projecting rims comprising: tubulor die means comprising a separating station for separating containers from a generally vertically disposed plastic web in which they have been differential pressure thermoformed; transversely spaced, generally horizontally extending, elongate upper and lower stack support chutes extending forwardly from said die means and having support and guide surfaces generally concentric with the axes of said die means; means for moving the separated containers in stacks along said chutes and adding newly separated containers to the rear of the stacks at the separating station so that said stacks grow in length as containers are separated; conveyor means spanning said stack support chutes adjacent the front ends thereof; a first and second plurality of separating fingers mounted to engage the rim of a container in each stack intermediate the ends of each of said upper and lower chutes respectively; and means moving said first and second pluralities of fingers forwardly and rearwardly but in opposite directions at the same time to separate portions of said upper and lower tiers of stacks from the remainder thereof and convey them to said conveyor means from the upper and lower tiers alternately.

5. The combination defined in claim 4 in which support means extends outwardly from said upper tier of chutes above said conveyor means; said support means includes members movable from a stack retaining position to a stack releasing position; and means is actuatable to move said latter members to stack releasing position.

6. The combination defined in claim 5 in which said support means includes a stationary support extending from each chute and a transversely movable frame having forwardly extending members for each chute which in one position of said movable frame cooperate with said stationary supports to retain the separated stack portions; and motor means for moving said frame transversely to release said stack portions from said support means simultaneously.

7. Apparatus for handling generally horizontally disposed rows of stacked containers having radially projecting rims comprising: tubular die means comprising a separating station for separating containers from a generally vertically disposed plastic web in which they have been differential pressure thermoformed; transversely spaced, generally horizontally extending, elongate stack support chutes extending forwardly from said die means and having support and guide surfaces generally concentric with the axes of said die means; means for moving the separated containers in stacks along said chutes and adding newly separated containers to the rear of the stacks at the separating station so that said stacks grow in length as containers are separated; conveyor means for said stack support chutes adjacent the front ends thereof; a plurality of separting fingers mounted to engage the rim of a container in each stack intermediate the ends of each chute; forwardly extending guides in said chutes extending from near the rear to near the front of said chutes at a spaced distance inwardly from a wall of each chute to radially compress the container stack sufficiently to hold said stack in nested condition and aid the separation of a portion of a stack without displacing containers behind the stack; and means moving said fingers forwardly to separate portions of said stack from the remainder thereof and convey them to said conveyor means.

8. Apparatus for handling generally horizontally disposed rows of stacked containers having radially projecting rims comprising: tubular die means comprising a separating station for separating containers from a generally vertically disposed plastic web in which they have been differential pressure thermoformed; transversely spaced, generally horizontally extending, elongate stack support chutes extending forwardly from said die means and having support and guide surfaces generally concentric with the axes of said die means; means for moving the separated containers in stacks along said chutes and adding newly separated containers to the rear of the stacks at the separating station so that said stacks grow in length as containers are separated; conveyor means for said stack support chutes adjacent the front ends thereof; a plurality of separating fingers mounted to engage the rim of a container in each stack intermediate the ends of each chute; and means moving said fingers forwardly to separate portions of said stack from the remainder thereof and convey them to said conveyor means; said means moving said fingers forwardly comprising platen means connecting said fingers for movement in unison; electric circuit means; a fluid pressure cylinder means operated thereby and connected to said platen means for moving the fingers forwardly and rearwardly; and switch means operable when the stack in one said chutes has grown to a predetermined length for operating said cylinder means and moving said fingers from forward rest position rearwardly past said containers and thence forwardly to separate a portion of the stack in each chute and convey it to said conveyor means.

9. Apparatus for separating a group of nested articles from a stack of such articles comprising means for supporting said stack; means for engaging an article between the ends of said stack; means for moving said engaging means relatively to said stack in a direction toward one end of the latter while maintaining said engaging means in engagement with said article, whereby the group of articles between said engaging means and said one end of said stack is separated from said stack; movable conveyor means for receiving the group of articles separated from said stack; means mounting said conveyor means in the path of movement of said group of articles separated by said engaging means; elevator means for receiving said group of articles from said conveyor means and conducting said group of articles for discharge to a level other than that of said conveyor means; means mounting said elevator means in the path of articles moved by said conveyor means; receiver means mounted in a position to receive said group of articles from said elevator means; and diverting means interposed between said elevator means and said receiver means operable by a selected group of said articles to divert said selected group from said receiver means.

10. Apparatus for separating groups of nested articles from a plurality of stacks of such articles located at different levels, said apparatus comprising first means for supporting a first stack of said articles at one level; second means for supporting a second stack of said articles at a second level; first engaging means for engaging an article in said first stack between the ends thereof; second engaging means for engaging an article in said second stack between the ends thereof; and means for moving said first and second engaging means relatively to the respective stacks sequentially in a direction toward one end of said stacks whereby the group of articles between each of said engaging means and the one end of the respective stack may be separated therefrom.

11. Apparatus for separating groups of nested articles from a plurality of stacks of such articles located at different levels, said apparatus comprising first means for supporting a first stack of said articles at one level; second means for supporting a second stack of said articles at a second level; first engaging means for engaging an article in said first stack between the ends thereof; second engaging means for engaging an article in said second stack between the ends thereof; means for moving said first and second engaging means relatively to the respective stacks in a direction toward one end of said stacks whereby the group of articles between each of said engaging means and the one end of the respective stacks may be separated therefrom; support means mounted in a position to support at least one of said groups of articles; and means for shifting said support means to a position in which it is incapable of supporting said one of said groups.

12. Apparatus for separating groups of nested articles from a plurality of stacks of such articles located at different levels, said apparatus comprising first means for supporting a first stack of said articles at one level; second means for supporting a second stack of said articles at a second level; first engaging means for engaging an article in said first stack between the ends thereof; second engaging means for engaging an article in said second stack between the ends thereof; and means for moving said first and second engaging means relatively to the respective stacks in a direction toward one end of said stacks whereby the group of articles between each of said engaging means and the one end of the respective stack may be separated therefrom; said means for moving said first and second engaging means being common to both said first and second engaging means.

13. Apparatus for handling a generally horizontally disposed row of stacked containers having radially projecting rims comprising: tubular die means comprising a separating station for separating containers from a generally vertically disposed plastic web in which they have been differential pressure thermoformed; a generally horizontally extending, elongate stack support chute extending forwardly from said die means and having support and guide surfaces generally concentric with the axes of said die means; means for moving the separated containers in stacks along said chute and adding newly separated containers to the rear of the stack at the separating station so that said stack grows in length as containers are separated; conveyor means spanning said stack support chute adjacent the front end thereof; a separating finger mounted to engage the rim of a container in said stack intermediate the ends of said chute; said finger being flexible and in normal position extending into said stack support chute; and means moves said finger in a reciprocatory path and halts said finger in forward position to permit said stack to grow so that when said finger returns rearwardly it brushes past the containers and tightly nests said stack; and said last mentioned means moving said fingers forwardly to separate a portion of said stack from the remainder thereof and convey it to said conveyor means.

14. The combination defined in claim 13 in which upper and lower tiers of stack support chutes are provided; a separate stack separating finger is provided for each; and means is provided for moving each finger forwardly and rearwardly but in opposite directions at the same time so that stack portions are delivered to said conveyor means from the upper and lower tiers alternately.

15. The combination defined in claim 14 in which support means extends outwardly from said chute of said upper tier above said conveyor means; said support means includes a member movable from a stack retaining position to a stack releasing position; and means is actuatable to move said latter member to stack releasing position.

16. The combination defined in claim 15 in which said support means includes a stationary support extending from said upper tier chute and a transversely movable frame having a forwardly extending member which in one position of said movable frame cooperates with said stationary support to retain the separated stack portion; and motor means for moving said frame transversely to release said separated stack portion.

17. Apparatus for separating a group of nested articles from superposed stacks of such articles comprising: means for supporting said stacks; means for engaging an article between the ends of each of said stacks; and means for moving said engaging means relatively to each of said stacks in a direction toward one end of said stacks to alternately separate stack portions from the upper and lower tiers.

18. Apparatus as set forth in claim 17 wherein said means for moving said engaging means comprises endless drive means connected with said means for engaging said article; and means for reciprocating said endless drive means.

19. Apparatus for handling generally horizontally disposed rows of stacked containers having radially projecting rims comprising: transversely spaced, generally horizontally extending, elongate stack support chutes for supporting nested stacks of said containers; means for engaging an article between the ends of each of said stacks including a member spanning the width of said chutes and a plurality of flexible fingers connected with said spanning member, at least one of said fingers extending into each of said stack support chutes; and endless drive means connected with said spanning member to move said fingers forwardly to separate portions of said stacks from the remainder thereof and convey them to said conveyor means.

(References on following page)

References Cited

UNITED STATES PATENTS

| | | | |
|---|---|---|---|
| 1,271,844 | 7/1918 | Bruckman | 83—85 |
| 2,345,310 | 3/1944 | Willoughby | 214—7 X |
| 2,833,185 | 5/1958 | Dixon. | |
| 2,917,884 | 12/1959 | Winkler et al. | |
| 2,997,204 | 8/1961 | Matteson | 221—114 X |
| 3,127,803 | 4/1964 | Midgley | 83—85 X |
| 3,313,482 | 4/1967 | Midgley et al. | |

FRANK T. YOST, Primary Examiner

U.S. Cl. X.R.

83—85, 106, 149, 155; 93—93; 214—7